Nov. 9, 1971  J. P. KELLY  3,618,219
GAGE

Filed Oct. 15, 1969  2 Sheets-Sheet 1

INVENTOR
JAMES P. KELLY
BY
Whittemore, Hulbert & Belknap
ATTORNEYS

Nov. 9, 1971  J. P. KELLY  3,618,219
GAGE
Filed Oct. 15, 1969  2 Sheets-Sheet 2
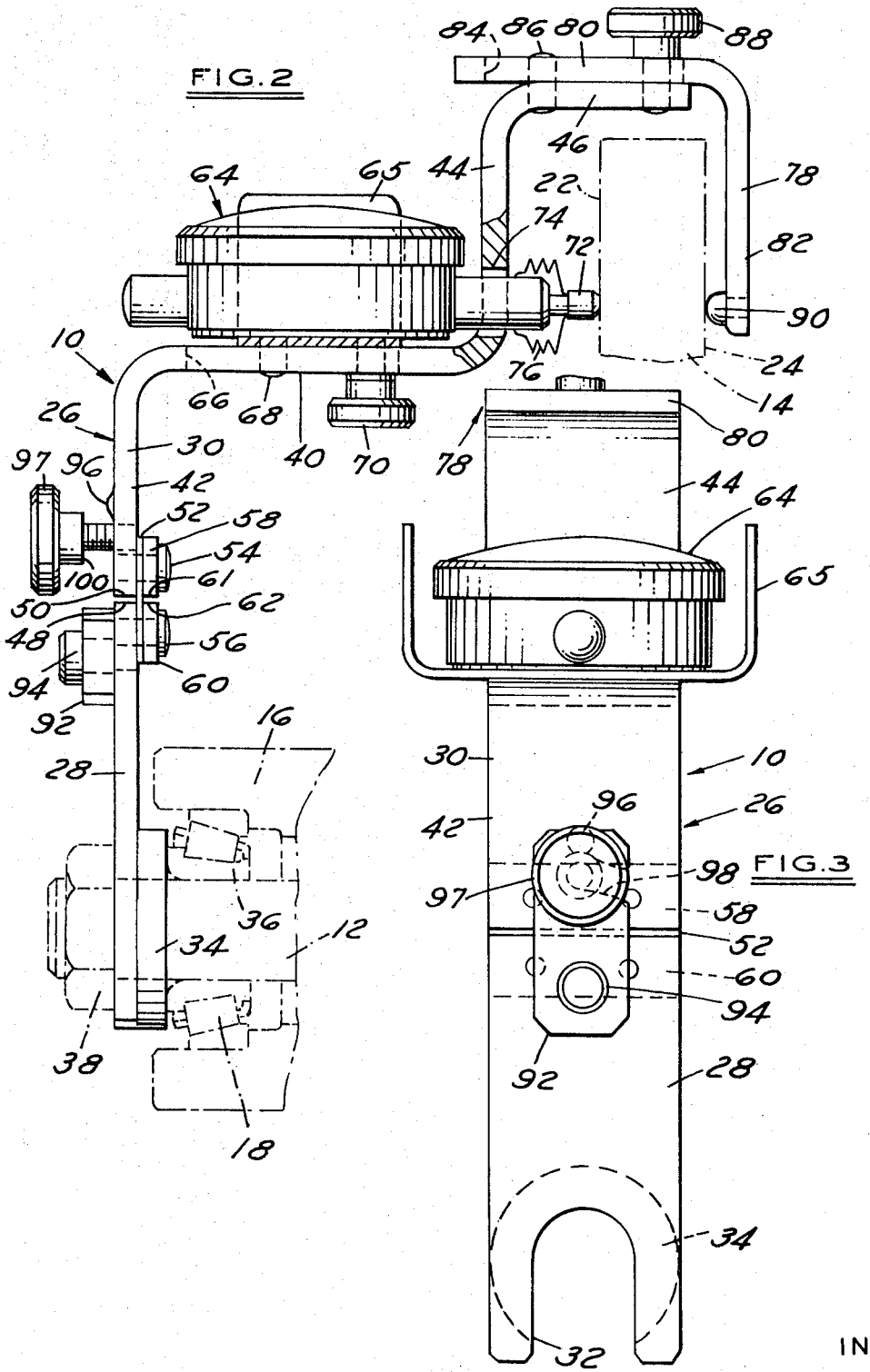
INVENTOR
JAMES P. KELLY
BY
Whittemore, Hulbert & Belknap
ATTORNEYS

United States Patent Office 3,618,219
Patented Nov. 9, 1971

3,618,219
GAGE
James P. Kelly, Farmington, Mich., assignor to A. G. Davis Gage & Engineering Co., Hazel Park, Mich.
Filed Oct. 15, 1969, Ser. No. 866,580
Int. Cl. G01b 3/38
U.S. Cl. 33—181 AT
12 Claims

ABSTRACT OF THE DISCLOSURE

A gage for checking the squareness of the rotor of a disc brake to the spindle axis and also for checking the parallelism of the two faces of the rotor.

The frame which mounts the gage has a resilient portion which is made rigid while checking squareness of the rotor relative to the spindle axis, and is released while checking parallelism of the two faces of the rotor.

SUMMARY OF THE INVENTION

It is a primary object of this invention to provide a gage adapted to check the squareness of the disc or rotor of a disc brake to the spindle axis and also to check the parallelism of the two faces of the rotor.

Another object is to provide a gage having a frame adapted to be mounted on the wheel spindle, in which the frame supports a contact engageable with one rotor face and a gaging device engageable with the other rotor face, and in which the frame is resilient so that the contact becomes a reference point for checking parallelism of the two faces.

Another object is to provide a gage having means for rendering the resilient frame rigid so that the spindle upon which the frame is mounted becomes a reference point for checking the squareness of the rotor by means of the gaging device.

Other objects and features of the invention will become apparent as the following description proceeds, especially when taken in conjunction with the accompanying drawings, wherein:

FIG. 2 is a view similar to FIG. 1, but shows the parts of the gage in position for checking the parallelism of the two faces of the rotor.

FIG. 3 is an elevational view of the gage of FIG. 1 as viewed from the left.

Figure 1:
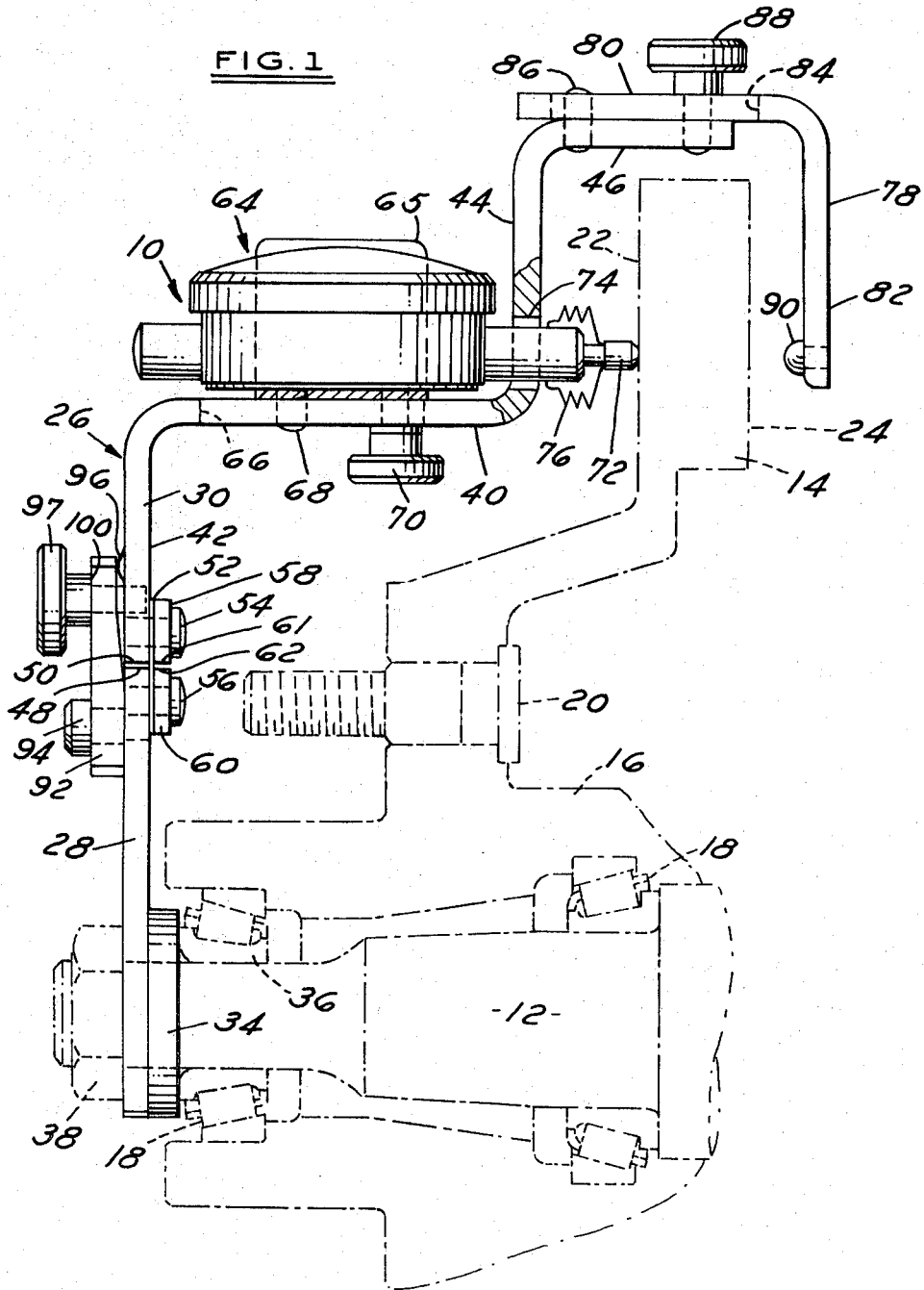
FIG. 1 is a side elevational view of the gage shown mounted on a wheel spindle with the parts in the position required for checking the squareness of the rotor of the disc brake to the spindle axis.

Referring now more particularly to the drawings, the gage is generally indicated by the reference numeral 10 and is adapted to be mounted upon the wheel spindle 12 of an automotive vehicle.

A disc or rotor 14 of a disc brake for the wheel is shown as having a hub portion 16 journaled for rotation on the spindle by the bearings 18. Bolts 20, one of which is shown extending through the body of the rotor 14, are provided to bolt a wheel, not shown, to the rotor. The wheel is removed during use of the gage to check the squareness of the rotor 14 to the spindle axis and also to check the parallelism of the two faces 22 and 24 of the rotor. These faces should of course be parallel and in radial planes with respect to the axis of spindle 12.

The gage 10 comprises a frame 26 having a frame bar 28 and a frame bar 30. One end of the frame bar 28 is formed with an open slot 32 adapted to fit over the spindle as shown in FIGS. 1 and 2. A riser plate 34 having a slot registering with the slot 32 is permanently secured to the inner side of frame bar 28 and bears against the bearing member 36 when the frame bar 28 is clamped on spindle 12 by the spindle nut 38. The riser plate 34 is provided to space the frame bar 28 from the end of the hub 16 of the brake rotor.

The frame bar 30 is shown as being of the same cross section as the frame bar 28 but instead of being straight like the frame bar 28, frame bar 30 preferably is of the generally Z-shaped configuration shown having the portion 40 at right angles to the portions 42 and 44, and having the portion 46 at right angles to the portion 44.

The portion 42 of frame bar 30 extends substantially in end-to-end continuation of the frame bar 28 in the same plane as the frame bar 28. The adjacent ends 48 and 50 of the frame bars 28 and 30 do not quite abut one another but are spaced apart a slight distance as indicated in FIGS. 1 and 2.

A leaf spring 52 connects frame bars 28 and 30 together. Leaf spring 52 extends across the gap between the adjacent ends 48 and 50 and is securely fastened to the inner sides of the adjacent end portions of the frame bars 28 and 30 by the fasteners 54 and 56. Rectangular protector plates 58 and 60 are clamped upon the leaf spring 52 by the heads of the fasteners 54 and 56 and are thus firmly secured to the frame bars 28 and 30 so as to provide a slight space between their adjacent edges 61 and 62 similar to the slight space between the adjacent ends 48 and 50 of the frame bars. While the distance between edges 61 and 62 may vary, it may be on the order of .010 inch. The protector plates add stiffness to the leaf spring 52, and together with the frame bars 28 and 30 prevent excessive flexing of the leaf spring and thus protect the leaf spring against fatigue or damage. The leaf spring retains its sensitivity, however, because of the relative thinness of its construction.

A dial indicator 64 is adjustably mounted on the outer side of the portion 40 of frame bar 30. A U-shaped guard 65 is carried by the dial indicator. As seen in FIGS. 1 and 2, the portion 40 of the frame member 30 has a slot 66 elongated in the direction of length of the portion 40. A guide pin 68 carried by the dial indicator extends downward into the slot. A lock screw 70 extends through the slot 66 and threads into the dial indicator. Obviously by tightening the lock screw 70 the dial indicator may be locked in any position of adjustment lengthwise of the frame bar portion 40 within the limits of slot 66.

The dial indicator has a plunger 72 extending through a hole 74 in the portion 44 of frame bar 36 for contact with the face 22 of the brake rotor. A dirt guard 76 may be provided to prevent foreign matter from entering the dial indicator housing.

When not in use, the dial indicator will be moved to the left in FIGS. 1 and 2 to the end of slot 66 so as to withdraw the plunger 72 to a safe position where it cannot be damaged. FIGS. 1 and 2 illustrate the dial indicator in an advanced or operative position in which the plunger 72 contacts rotor face 22.

The frame 26 also includes a frame bar 78 which has preferably the same cross section as the frame bars 28 and 30 and is of right angle form having the portions 80 and 82. The portion 80 overlies portion 46 of frame bar 30 and has a slot 84 enlongated in the direction of its length. A guide pin 86 fixed to the portion 46 of frame bar 30 extends upward into slot 84. Lock screw 88 extends through slot 84 and threads into portion 46 of frame bar 30 permitting the frame bar 78 to be locked in selected positions of adjustment closer to or further from the dial indicator 64. FIG. 1 shows the frame bar 78 in a position farther away from the dial indicator than FIG. 2.

The portion 82 of frame bar 78 is parallel to the portion 44 of frame bar 30 and has a contact preferably in the form of an easily replaceable tungsten carbide ball 90 disposed opposite the plunger 72 of the dial indicator for contact with the face 24 of the brake rotor 14. The ball 90 remains aligned with plunger 72 in all positions of adjustment of frame bar 78.

Means are provided for rigidly connecting the frame bars 28 and 30 so that they cannot flex relative to one another. For this purpose, a cam bar 92 is provided, pivoted to frame bar 28 near the end 48 thereof by a fastener 94. The cam bar is shown in an inoperative position in FIG. 2 in which it is swung away from frame bar 30. FIGS. 1 and 3 show the cam bar in its operative position in which it extends across the gap between the two frame bars 28 and 30 and overlies the portion 42 of frame bar 30. There is a raised detent 96 on the outer face of the portion 42 of frame bar 30. The cam bar rides up over the raised detent 96 when it is swung to its operative position so as to deflect the frame bar 30 slightly and thus flex the leaf spring 52 and place it under a constant pre-load. The detent 96 is rounded so that the cam bar 92 can easily ride up on the detent. A lock screw 97 threads into the frame bar 30 beneath the raised detent 96. The cam bar 92 has an arcuate slot 98 to clear the shank of lock screw 97 when the cam bar is swung to its operative position shown in FIGS. 1 and 3. When the lock screw 97 is tightened, its shoulder 100 bears against and clamps the cam bar 92 down on detent 96 to provide a rigid connection from the frame bar 28 to the frame bar 30. The rigid connection includes the cam bar 92, its supporting pivot fastener 94, lock screw 97 and the raised detent 96.

As stated above, the protector plates 58 and 60 are provided primarily to stiffen the leaf spring 52 and to prevent excessive flexing of the leaf spring. The adjacent edges 61 and 62 will normally be spaced far enough apart so that they do not contact when the cam bar 92 is swung to its operative position of FIGS. 1 and 3 to rigidify the frame 26 and slightly flex and pre-load the leaf spring 52. However, if desired, the edges 61 and 62 of the protector plates 58 and 60 may actually contact in the position of the parts shown in FIGS. 1 and 3, although this is not necessary to provide a rigid connection between frame bars 28 and 30.

In the use of the gage, and prior to mounting it on the spindle, the dial indicator 64 should be moved to the left in FIG. 1 as far as slot 66 will permit and should be clamped in that position by screw 70 so that the plunger 72 is withdrawn to a safe position. The frame bar 78 should be moved to the right to its limit of adjustment and clamped in that position by screw 88. Cam bar 92 is swung to the operative position shown in FIGS. 1 and 3 and locked in that position by the lock screw 97 to rigidify the frame and also to pre-load leaf spring 52.

The frame bar 28 is then mounted on the spindle 12 by fitting the slot 32 onto the spindle and applying the spindle nut 38 to clamp the gage securely on the spindle. The dial indicator 64 is then moved to the right in FIG. 1 and clamped in adjusted position by the lock screw 70 so that its plunger 72 is engaged against the rotor face 22. The ball contact 90 does not engage the rotor face 24 because of the position of frame bar 78 at its limit of adjustment to the right. The rotor 14 may now be rotated to check its squareness to the spindle axis. The squareness of the rotor 14 may be checked by direct reading of the dial indicator. During this time, the frame 26 is rigid by reason of the rigid connection between the frame bars 28 and 30 afforded by the cam bar 92 and associated parts. Thus the reading of the dial indicator will be based on the axis of spindle 12 as a reference point and indicate any departure from true squareness of the brake rotor.

FIG. 2 shows the gage adjusted to check for parallelism between the rotor faces 22 and 24. The frame bar 78 is adjusted to the left so as to engage the ball contact 90 against the rotor face 24. The lock screw 88 is then turned tight. Lock screw 97 is then backed off to release the cam bar 92 and the cam bar is turned to the inoperative position of FIG. 2. The pre-loading of the leaf spring 52 by the cam bar 92 is applied to the ball contact 90 and resiliently urges it under pressure against the rotor face 24 when the cam bar is moved to the inoperative position. The brake rotor 14 may now be rotated to check parallelism between the rotor faces 22 and 24 by reading directly from the dial indicator 64. Since the only connection between the frame bars 28 and 30 now is the flexible leaf spring 52, the ball contact 90 becomes the reference point from which the check is made.

What I claim as my invention is:

1. A gage for checking the squareness of the rotor of a disc brake to the spindle axis and also for checking the parallelism of the two faces of the rotor, comprising a resilient frame having means adapted to mount the same on the spindle, a gaging device mounted on said frame and having means for contacting one face of the rotor, releasable means for rendering said frame rigid while checking the squareness of the rotor to the spindle axis, and contact means adjustably carried by said frame and adapted to contact the other face of the rotor in one position of adjustment thereof, to check the parallelism of the two faces of the rotor when said releasable means is released.

2. A gage for checking the squareness of the rotor of a disc brake to the spindle axis and also for checking the parallelism of the two faces of the rotor, comprising a frame, said frame including a first frame member adapted to be mounted on the spindle, a second frame member, means providing a resilient connection between said frame members, a gaging device mounted on said second frame member having means for contacting one face of the rotor, releasable means providing a rigid connection between said frame members while checking the squareness of the rotor to the spindle axis, a third frame member adjustably carried by said second frame member having means to contact the other face of the rotor in one position of adjustment of said third frame member, said releasable means beingg released while checking the parallelism of the two faces of the rotor so that said means providing said resilient connection can yieldably hold said contact means of said second frame member in contact with said other face of the rotor.

3. The gage defined in claim 2, wherein said releasable means includes an element carried by one of said first and second frame members, and means for releasably securing said element to the other of said first and second frame members.

4. The gage defined in claim 2, wherein said releasable means includes a lever pivoted to one of said first and second frame members, said lever being adapted to pivot from an operative position in overlying relation to the other of said first and secconf frame members to an inoperative position, and means for releasably securing said lever to the other of said first and second frame members when said lever is in its operative position.

5. The gage defined in claim 4, said other frame member and said lever having cooperating means engageable with one another in the operative position of said lever to pre-load the means providing said resilient connection.

6. The gage defined in claim 4, wherein said means providing a resilient connection comprises a leaf spring.

7. The gage defined in claim 6, said other frame member and said lever having cooperating surfaces engageable with one another in the operative position of said lever to flex and pre-load said leaf spring, said cooperating surfaces including a raised detent on said other frame member.

8. The gage defined in claim 7, having means for limiting the permissible flexure of said leaf spring.

9. The gage defined in claim 8, wherein said flexure limiting means comprises protector plates secured to said first and second frame members in slightly spaced relation to one another.

10. The gage defined in claim 9, wherein said plates are clamped respectively over the end portions of said leaf spring to add stiffness to said leaf spring without substantially reducing its sensitivity.

11. The gage defined in claim 2, wherein said third frame member is adjustably carried by said seccond frame member by means including an elongated slot in one of said second and third frame members, a guide pin on the other of said second and third frame members extending into said slot, and a screw spaced from said guide pin and threadedly engaging said other of said second and third frame members, said screw extending through said slot and when tightened clamping said third frame member to said second frame member in adjusted position.

12. The gaging device in claim 2, wherein said gaging device is adjustably mounted on said second frame member by means including an elongated slot in said second frame member, a guide pin on said gaging device extending into said slot, and a screw spaced from said guide pin and threadedly engaging said gaging device, said screw extending through said slot and when tightened clamping said gaging device to said second frame member in adjusted position.

References Cited

UNITED STATES PATENTS

| | | | |
|---|---|---|---|
| 2,545,784 | 3/1951 | Kenner | 33—180 AT |
| 2,763,934 | 9/1956 | Creek et al. | 33—174 L |
| 3,359,642 | 12/1967 | Jessen et al. | 33—181 AT |

FOREIGN PATENTS

| | | | |
|---|---|---|---|
| 281,996 | 7/1928 | Great Britain | 33—206.16 |

WILLIAM D. MARTIN, JR., Primary Examiner

U.S. Cl. X.R.

33—147 R, 174 Q, 172 R